June 4, 1968  A. L. TROUTNER  3,386,222
HIGH-LOAD TRUSS JOIST LINK
Filed May 23, 1966
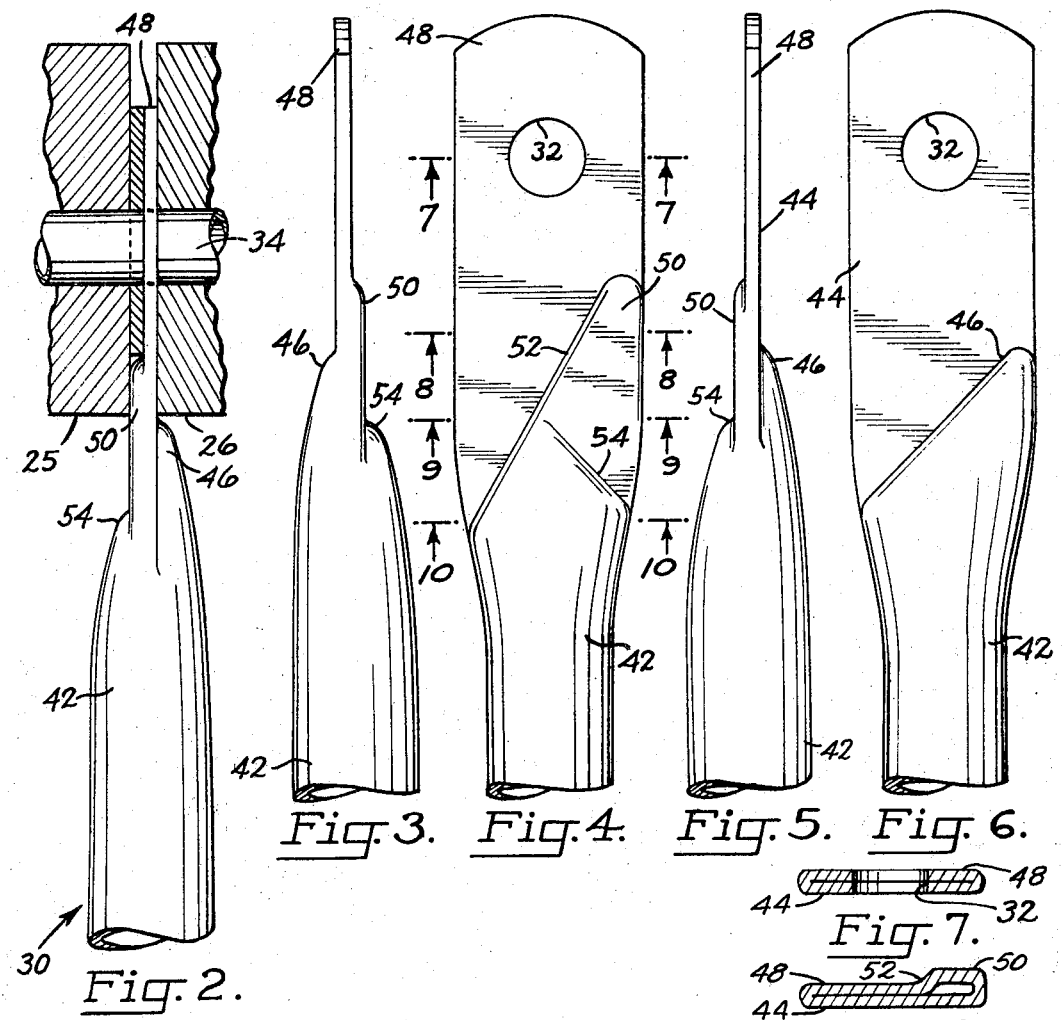
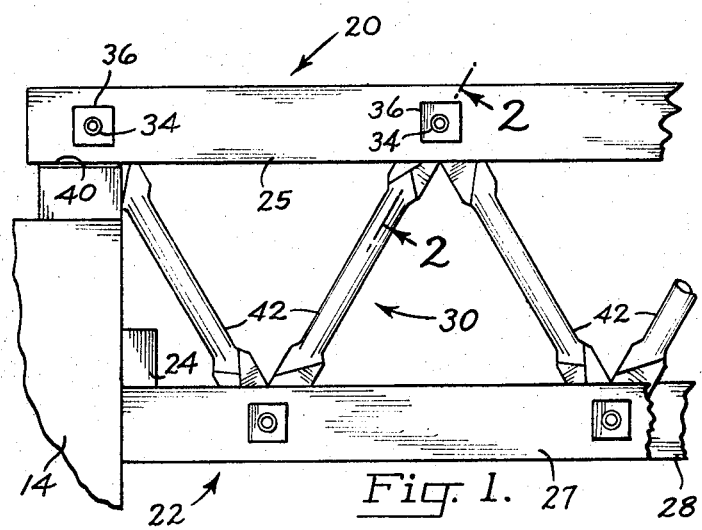
Arthur L. Troutner
INVENTOR
BY
Atty.

United States Patent Office 3,386,222
Patented June 4, 1968

3,386,222
HIGH-LOAD TRUSS JOIST LINK
Arthur L. Troutner, Skyline Drive,
Boise, Idaho 83702
Filed May 23, 1966, Ser. No. 552,025
2 Claims. (Cl. 52—693)

ABSTRACT OF THE DISCLOSURE

Each of the flattened ends of a truss link rod has opposed surfaces offset inwardly from the periphery of the rod, one surface being monoplanar and the other biplanar, thereby forming a thin terminal section having a thickness equal to one-half the width of the space between the pair of structural pieces comprising the chord of a truss joist, and a thick section having a thickness equal to the width of said space. A pair of such rods thus may have their thin terminal sections overlapped, with the thick sections forming pads filling the space between the pair of structural pieces.

Summary of the invention

This invention pertains to a link for inclusion in high-load truss joists.

It is the general purpose of the present invention to provide a link for use in the manufacture of truss joists which have high strength in compression and which may be manufactured from links arranged in zigzag relation at various predetermined angles to each other.

Broadly, the present invention involves the contouring of the flattened ends of truss joist links to afford overlapping of thin sections thereof while providing thick sections which form pads filling the space between a pair of structural pieces of a truss joist chord, whereby to stabilize the latter and to prevent its crumpling under heavy load.

In the drawings:

FIG. 1 is a fragmentary view in side elevation of a truss joist including the high load links of the present invention;

FIG. 2 is a fragmentary sectional view taken along line 2—2 of FIG. 1 and illustrating the manner of interconnecting the high load links of the invention to each other as well as to the chords with which they are assembled.

FIG. 3 is a fragmentary view in side elevation illustrating the configuration of one side of one end of the link;

FIG. 4 is a fragmentary view in elevation of the link rotated 90° from the position of FIG. 3 and illustrating the configuration of one face of one end of the link;

FIG. 5 is a view in fragmentary elevation rotated 90° from the position of FIG. 4 and illustrating the configuration of the other side of the link;

FIG. 6 is a fragmentary view in elevation rotated 90° from the link position of FIG. 5 and illustrating the configuration of the other face of one end of the link; and FIGS. 7, 8, 9 and 10 are transverse sectional views taken along line 7—7, 8—8, 9—9, and 10—10 respectively of FIG. 4 and illustrating the cross sectional configuration of the link at various distance intervals spaced inwardly from the end thereof.

As is clear particularly from FIGS. 1 and 2, the high load links of the invention are employed in truss joists which are designed to be supported in parallel, spaced arrangement between a pair of bearing supports, one of which is indicated at 14. The bearing supports may comprise any structural supports, such as wood or steel beams or walls of wood, concrete or masonry.

Each joist is composed of an upper chord, indicated generally at 20, and a lower chord, indicated generally at 22. Upper chord 20 is longer than lower chord 22. Its ends overlie and are supported by the bearing plate.

The ends of lower chord 22 bear against the supports spanned by the joist in a cantilever construction. The chord is nailed or otherwise fastened to a stabilizing strip 24 mounted on the inside surface of bearing wall 14.

To supply the requisite strength and length, each of chords 20, 22 is a composite of two structural pieces placed side by side, parallel to each other and spaced apart horizontally to provide an intermediate space of sufficient width to accommodate the linking members.

Thus upper chord 20 may be a composite of 2 x 6 pieces 25, 26 placed on edge. Similarly lower chord 22 may be a composite of 2 x 6 pieces 27, 28, also placed on edge.

Upper chord 20 and lower chord 22 are interconnected by a lacing of link members arranged in zigzag fashion with their ends overlapped. Each link member comprises a metal tube, indicated generally at 30, having flattened ends each of which is provided with a central perforation 32.

The flattened ends have a thickness such that when they are overlapped, they may be inserted in the space between the structural pieces comprising each chord, as shown particularly in FIG. 2.

At spaced, offset intervals the upper and lower chords are cross bored to form openings which register with perforations 32 through the flattened ends of the link members. Pin means are inserted through the registering perforations to interconnect the link members and chords, as well as to secure together the component pieces of each chord.

Although various types of pin means may be employed for this purpose, in the illustrated form of the truss joist the pin means comprises a cylinder 34 dimensioned for snugly fitting reception in the cross bores through the structural pieces and the perforations through the flat link ends. The ends of the cylinder project from the exterior side faces of the chord.

Friction washers 36 are pressed on the projecting ends of pin 34, thus securing the pins and the joist components in their structural position relative to each other. The washers are of sufficient diameter so that they overlie a substantial area of the side face of the chord.

Considerable stress necessarily is transmitted by each terminal pin 34 against the substance of the chord immediately below it. The bearing stress thus exerted may damage the chord by crushing it. An angular, metal bearing clip 40, accordingly is interposed between the opposed chord members, as well as between the chord and the bearing plate. The horizontal section of the angled bearing clip is secured to the bearing plate while the vertical section is perforated and receives pin 34. It thus serves as a load distributing member.

When truss joists of the foregoing construction are employed in high load applications, the flattened ends of the links 30, which are received in overlapped relation in the space between the structural members comprising each chord, provide a location of structural weakness when the links are in compression. As stated hereinabove, it accordingly is the general purpose of the present invention to provide a link structure which overcomes this difficulty while still permitting arrangement of the link pairs in angular position relative to each other of magnitudes designed to suit particular installations.

The link structure accomplishing this purpose is illustrated in detail in FIGS. 2–10 inclusive.

As shown in those figures each link 30 comprises a metal tube 42 fabricated, for example, from sections of cold-rolled, electric-welded, steel tubing of appropriate length, diameter, and gauge. The ends of each link are flattened, but asymmetrical. Thus each flat end has one side face 44 which is monoplanar. It is defined by a shoulder 46 arranged at an angle which suits the overlap angle of a pair of the links.

The opposite side face of the flattened end of each link is stepped or biplanar, thus forming a thin, flat, terminal section 48 and a thick, inner section 50. The two end sections are defined by a shoulder 52 disposed at an angle appropriate to accommodate the overlapped links when arranged at the desired angle to each other. To suit this purpose further, the inner limit of section 50 is defined by a shoulder 54, which likewise is arranged at a suitable angle.

There thus is formed a thin terminal section and a thick inner section on each end of the link.

The thin terminal section has a thickness equal to approximately one-half the width of the space between the structural pieces comprising each chord. The thick inner section has a thickness which is substantially equal to the width of such space.

Both ends of each link are formed and flattened in the same manner. The effect is evident from a consideration of sectional views 7–10 inclusive.

As a consequence of the indicated configuration, it is possible to overlap the formed ends of adjacent links in the manner indicated in FIGS. 1 and 2.

In this overlapped relation, monoplanar surface 44 lies substantially flush with the inner side face of the adjacent chord member. The opposite side face of terminal section 48 lies flush against the corresponding face of the companion overlapped link.

Accordingly, when the links are arranged in their overlapped operative position, side face 50 of the thick inner section of the link end also lies flush against the adjacent side face of the companion overlapped link. A pad thus is formed which completely fills the space between the chord components. When the components are united, as by pressing on friction washers 36, the pad is clamped between the chord components. This stabilizes the chord when it is in compression and prevents its crumpling under a heavy load.

It is to be understood that the form of my invention herewith shown and described, is to be taken as a preferred example of the same, and that various changes in the shape, size and ararngement of parts may be resorted to, without departing from the spirit of my invention, or the scope of the subjoined claims.

Having thus described my invention, I claim:

1. In a composite truss joist including two vertically spaced chords dimensioned to span two horizontally spaced bearing walls, each chord comprising two structural pieces placed side by side parallel to, and spaced from each other, a plurality of links arranged in zigzag relation between the chords, with the ends of adjacent links overlapped and extending into the spaces between the structural pieces comprising the chords, there being registering openings through the pieces and each pair of overlapped link ends, and pin means penetrating the registering openings securing the links to each other and to the pieces, a high load link comprising:

(a) a metallic rod having asymmetrical flat ends, the opposed surfaces of each flat end being offset inwardly from the periphery of the rod, (b) each flat end having one face which is monoplanar and an opposite face which is stepped and biplanar, thereby forming a thin terminal section and a thick inner section, (c) the thin terminal section having a thickness equal to substantially one-half the width of the space between the structural pieces comprising the chord and the thick, inner section having a thickness substantially equal to the width of said space, (d) the monoplanar face being adapted for positioning substantially flush against the side face of one of the structural pieces defining said space, (e) the part of the biplanar face defining the thin terminal section being adapted for positioning flush against the corresponding part of the companion link which it overlaps, and (f) the part of the biplanar face defining the thick inner section being adapted for positioning substantially flush against both the opposing side walls of the structural pieces defining said space, in clamped relation thereto.

2. The high load truss joist link of claim 1 wherein the stepped boundary separating the outer and inner sections of the end is arranged at an angle with reference to the longitudinal axis of the link predetermined to permit arrangement of the overlapped link pairs at a desired angle to each other.

References Cited

UNITED STATES PATENTS

| 849,908 | 4/1907 | Mansfield | 52—655 |
| 1,098,405 | 6/1914 | Reinecke. | |
| 1,813,373 | 7/1931 | Wooldridge | 52—691 |
| 2,083,354 | 6/1937 | Whittier. | |
| 3,137,899 | 6/1964 | Troutner | 52—693 |

FRANCIS K. ZUGEL, *Primary Examiner.*